US011735169B2

United States Patent
Noel et al.

(10) Patent No.: US 11,735,169 B2
(45) Date of Patent: Aug. 22, 2023

(54) SPEECH RECOGNITION AND TRAINING FOR DATA INPUTS

(71) Applicant: International Business Machines Corporation, Armonk, NY (US)

(72) Inventors: Marco Noel, Quebec (CA); Andrew R. Freed, Cary, NC (US); Victor Povar, Vancouver (CA); Shane Michael Kilmon, Tyngsborough, MA (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 16/825,183

(22) Filed: Mar. 20, 2020

(65) Prior Publication Data
US 2021/0295829 A1    Sep. 23, 2021

(51) Int. Cl.
*G10L 15/18* (2013.01)
*G10L 15/04* (2013.01)
(Continued)

(52) U.S. Cl.
CPC ............ *G10L 15/18* (2013.01); *G06F 40/205* (2020.01); *G06F 40/289* (2020.01); *G06N 20/00* (2019.01); *G10L 15/04* (2013.01); *G10L 15/26* (2013.01)

(58) Field of Classification Search
CPC ......... G10L 15/18; G10L 15/04; G10L 15/26; G06F 40/205; G06F 40/289; G06F 40/279
See application file for complete search history.

(56) References Cited

U.S. PATENT DOCUMENTS

| | | | |
|---|---|---|---|
| 5,651,056 A * | 7/1997 | Eting | G10L 15/26 379/88.01 |
| 6,694,295 B2 * | 2/2004 | Lindholm | G10L 15/22 704/252 |

(Continued)

FOREIGN PATENT DOCUMENTS

| | | |
|---|---|---|
| CN | 1212404 A | 3/1999 |
| CN | 101996629 A | 10/2012 |

(Continued)

OTHER PUBLICATIONS

Noel et al., "IBM Watson Speech to Text—A Training Guidebook," IBM, Watson, Feb. 13, 2019, 59 pages, Copyright 2019 IBM Corporation.

*Primary Examiner* — Anne L Thomas-Homescu
(74) *Attorney, Agent, or Firm* — Rachel M. Yadlosky

(57) ABSTRACT

A method, system, and computer program product for recognizing, and training to recognize, alphanumeric speech data inputs. The method may include segmenting a data input into a sequential n-gram chunks based on a predetermined rule, where the data input is received through speech recognition. The method may also include receiving metadata regarding characteristics of the data input. The method may also include generating a language model based on the metadata. The method may also include generating a first set of language model variations of the data input. The method may also include training the language model based on at least the first set of language model variations. The method may also include generating one or more alternatives for the data input using the trained language model. The method may also include transmitting an output including the one or more alternatives for the data input.

20 Claims, 6 Drawing Sheets

(51) Int. Cl.
  *G06N 20/00* (2019.01)
  *G06F 40/205* (2020.01)
  *G06F 40/289* (2020.01)
  *G10L 15/26* (2006.01)

(56) References Cited

U.S. PATENT DOCUMENTS

| | | | | |
|---|---|---|---|---|
| 7,280,964 | B2* | 10/2007 | Wilson | G09B 5/04 |
| | | | | 704/251 |
| 8,332,207 | B2* | 12/2012 | Brants | G06F 40/44 |
| | | | | 704/251 |
| 9,444,934 | B2 | 9/2016 | Nelson et al. | |
| 10,147,428 | B1* | 12/2018 | Shastry | G10L 15/04 |
| 10,573,312 | B1* | 2/2020 | Thomson | G10L 15/26 |
| 10,594,757 | B1* | 3/2020 | Shevchenko | G06F 40/186 |
| 2002/0032567 | A1* | 3/2002 | Lindholm | G10L 15/22 |
| | | | | 704/246 |
| 2002/0128821 | A1* | 9/2002 | Ehsani | G06F 40/35 |
| | | | | 704/10 |
| 2003/0229497 | A1* | 12/2003 | Wilson | G09B 19/04 |
| | | | | 704/270.1 |
| 2004/0117380 | A1* | 6/2004 | Perrow | G06F 9/45512 |
| 2006/0111907 | A1* | 5/2006 | Mowatt | G10L 15/183 |
| | | | | 704/257 |
| 2008/0243481 | A1* | 10/2008 | Brants | G06F 40/44 |
| | | | | 704/9 |
| 2010/0268716 | A1* | 10/2010 | Degaugue | G06F 16/36 |
| | | | | 709/224 |
| 2012/0323557 | A1* | 12/2012 | Koll | G06F 3/04817 |
| | | | | 704/8 |
| 2013/0090921 | A1* | 4/2013 | Liu | G10L 15/063 |
| | | | | 704/10 |
| 2013/0173269 | A1* | 7/2013 | Adler | G06F 40/289 |
| | | | | 704/251 |
| 2014/0324434 | A1* | 10/2014 | Vozila | G10L 15/18 |
| | | | | 704/257 |
| 2016/0062985 | A1* | 3/2016 | Epstein | G06F 40/216 |
| | | | | 704/9 |
| 2016/0093294 | A1* | 3/2016 | Kapralova | G10L 15/01 |
| | | | | 704/232 |
| 2016/0098995 | A1* | 4/2016 | Nelson | H04M 3/4936 |
| | | | | 704/235 |
| 2016/0307564 | A1* | 10/2016 | Sethy | G10L 15/16 |
| 2016/0379624 | A1* | 12/2016 | Fujimura | G10L 15/01 |
| | | | | 704/235 |
| 2017/0031896 | A1* | 2/2017 | Dymetman | G06F 40/216 |
| 2017/0154640 | A1* | 6/2017 | Wang | G10L 25/24 |
| 2017/0294184 | A1* | 10/2017 | Bradley | G10L 15/04 |
| 2017/0358297 | A1* | 12/2017 | Scheiner | G10L 15/30 |
| 2018/0096687 | A1* | 4/2018 | Cook | G10L 15/26 |
| 2019/0324780 | A1* | 10/2019 | Zhu | G06F 3/011 |
| 2020/0013408 | A1* | 1/2020 | Church | G10L 15/26 |
| 2021/0209304 | A1* | 7/2021 | Yang | G10L 15/187 |
| 2021/0225389 | A1* | 7/2021 | Proenca | G09B 5/00 |

FOREIGN PATENT DOCUMENTS

| | | | |
|---|---|---|---|
| CN | 105159890 A | 5/2021 | |
| EP | 0647344 B1 | 1/2001 | |
| EP | 1466150 B1 | 10/2018 | |
| WO | 2001082291 A1 | 11/2001 | |
| WO | WO-2014111959 A2 * | 7/2014 | ........... G06F 17/276 |

* cited by examiner

SPEECH RECOGNITION AND TRAINING FOR DATA INPUTS

BACKGROUND

The present disclosure relates to speech to text technology and, more specifically, to training the system to recognize alphanumeric speech data inputs in a speech to text system.

With the increase in technology capabilities, speech to text capabilities are becoming increasingly utilized. For example, when a user calls a help desk, service, etc., the user often has to give an account number, social security number, birthday, password, etc. The user may use speech to input the required data (for example, inputting the data vocally over the phone). Speech recognition technology may be used to determine what was inputted via speech and convert, or translate, this input into text that a computer system can recognize and process.

SUMMARY

The present disclosure provides a computer-implemented method, system, and computer program product to recognize, and train, alphanumeric speech data inputs. The method may include segmenting a data input into a sequential n-gram chunks based on a predetermined rule, where the data input is received through speech recognition. The method may also include receiving metadata regarding characteristics of the data input. The method may also include generating a language model based on the metadata. The method may also include generating a first set of language model variations of the data input. The method may also include training the language model based on at least the first set of language model variations. The method may also include generating one or more alternatives for the data input using the trained language model. The method may also include transmitting an output including the one or more alternatives for the data input.

The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
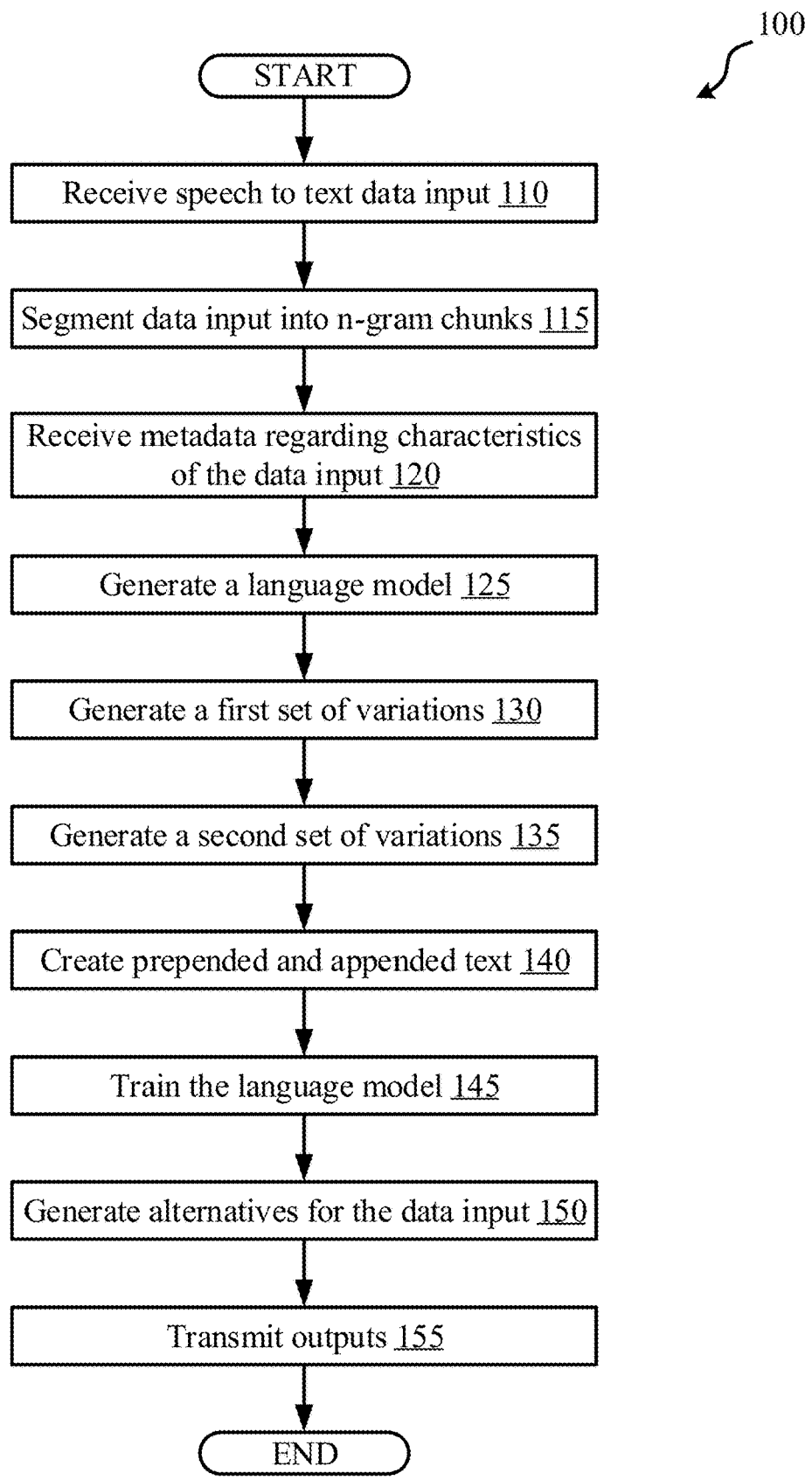
FIG. 1 depicts a flowchart of a set of operations for training speech recognition technology and utilizing this technology to recognize alphanumeric speech data inputs, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to speech to text technology and, more specifically, to training the system to recognize alphanumeric speech data inputs in a speech to text system. While the present disclosure is not necessarily limited to such applications, various aspects of the disclosure may be appreciated through a discussion of various examples using this context.

Speech recognition technology may be used in a variety of different use cases. These use cases may require the speech recognition to handle and recognize multiple types of utterances. For example, a conventional speech recognition use case includes using general utterances (from a user) to identify intents and entities. A conventional speech recognition base model may be used to recognize and common words and sentences and convert them to text. For example, a general utterance of "my name is John Doe," may be recognized and converted to text by a conventional speech recognition model.

However, conventional speech recognition technology may have difficulties with more complex utterances. For instance, it may be challenging for speech recognition technology to recognize data inputs such as IDs, dates, or other alphanumeric data inputs, and conventional speech recognition technology may not be very accurate in recognizing alphanumeric inputs. An alphanumeric data input may be a data input that includes both letters/words and numbers. For example, the alphanumeric utterance of "my date of birth is Jan. 8, 1974" may be difficult to recognize using conventional speech recognition technology, due to the combination of words and numbers within the utterance. Conventional speech recognition may not differentiate an "8" from an "h" from an "a;" an "f" from an "s;" a "d" from a "t;" an "m" from an "n;" a "4" from the word "for;" a "to" from a "too" from the number "2;" etc. Therefore, continuing the previous example, conventional speech recognition may translate the above speech input into text such as "my date of birth is January H 1970 For," which is not accurate.

The present disclosure provides a computer-implemented method, system, and computer program product to recognize, and train, alphanumeric speech data inputs. After a data input is received by the speech recognition system (for example, via speech by a user), the data may be segmented into chunks (i.e., n-gram chunks) and may be processed via the segmented chunks, in some instances. Various rules and characteristics (including rules specific to the input, general speech rules and variations, etc.) may be used to generate a language model (and, in some instances, an acoustic model) based on the rules and characteristics. This model, or models, may be trained using the various rules and characteristics along with various data inputs, in order to improve the model. Segmenting the data into chunks, and using various rules and characteristics to generate and train the language model, may improve the accuracy of the speech recognition technology for alphanumeric data inputs.

Referring now to FIG. 1, a flowchart illustrating a method 100 for training speech recognition technology and utilizing this technology to recognize alphanumeric speech data inputs is depicted, according to some embodiments. In some embodiments, method 100 is executed by a server (e.g., computer system/server 602 (FIG. 6)) on, or connected to, a speech recognition system (e.g., speech recognition system 330 (FIG. 3), speech recognition system 430 (FIG. 4), and/or speech recognition 530 (FIG. 5)). In some embodiments, method 100 is implemented as a computer script or computer program (e.g., computer executable code) to be executed on or connected to a computer system (e.g., computer system 600 (FIG. 6)). In some embodiments, the speech recognition system is on or connected to the computer system.

Method 100 includes operation 110 to receive a data input. The data input may be a speech to text data input. In some embodiments, receiving the data input includes receiving a speech data input and converting the speech to text. In some embodiments, the speech is already converted to text before it is received by the system in operation 110. The conversion from speech to text may be done using conventional methods.

For instance, a client (for example, company) may use conventional speech recognition technology to translate user speech to text. However, this conventional speech recognition technology may not accurately translate the speech to text. Therefore, the client may send the text data input (as it has already been converted to text by the client) to the system performing method 100 to correct the text data input and create an improved model for translating speech to text that the client can use in future translations. For example, a user may vocally input information to a client system (for example, an insurance company, a healthcare company, or any other company utilizing speech recognition technology), the client system may convert the speech to text, and then may transmit the text of the data input to the system.

In some instances, there is not a third party client and the system performing method 100 is the system that receives speech directly from a user. In these instances, the system may originally translate the speech to text using conventional methods in operation 110. For example, a user may vocally input information (for instance, via phone) to the system, and the system may convert the speech/vocal input into text.

Method 100 includes operation 115 to segment the data input into sequential n-gram chunks based on a predetermined rule. Once the data input has been converted into text (discussed in operation 110), the data input may be segmented into n-gram chunks, with n being relative to the length of the data input (received and established as text in operation 110). An n-gram may be a sequence of n letters, numbers, words, or any combination of the three. In some embodiments, the n-gram chunks may be either 4-gram chunks or 5-gram chunks, therefore segmenting the data into sequential n-gram chunks may include segmenting the data into sequential 4-gram chunks or 5-gram chunks. In some embodiments, segmenting the data input into 4-gram (or 5-gram) chunks includes breaking the data input (in its textual form) up into sequential 4-character (or 5-character) chunks. In some embodiments, segmenting the data input into 4-gram (or 5-gram) chunks includes breaking the data input up into sequential 4-word (or 5-word) chunks. Examples of segmenting the data input into n-gram chunks are discussed below.

In some embodiments, the predetermined rule includes that for data inputs that are 9 positions (e.g., characters, words, etc.) or less, the n-gram chunks are 4-gram chunks, and for data inputs that are 10 positions or higher, the n-gram chunks are 5-gram chunks. Positions may be characters (e.g., letters or numbers), in some embodiments. For example, a data input that includes "12345ABCD" has 9 positions and is thus segmented into 4-gram chunks. Segmenting the example data input into 4-gram chunks may include segmenting the input into chunks "1234," "2345," "345A," "45AB," "5ABC," and "ABCD." This way, the data input is segmented into sequential 4-character chunks starting with the first character, until all characters have been segmented off.

In another example, when the input includes both words and numbers, the data input includes "my birthday is Jan. 1, 1985." In this example, the various positions may include my-birthday-is-January-1,-1985, with the spaces indicating the separation between positions of the data input. In this example, there are 6 positions, therefore the data input is segmented into 4-gram chunks. Segmenting this example data input into 4-gram chunks may include segmenting the input into chunks "my birthday is January" "birthday is January 1," "is Jan. 1, 1985."

In another example, a data input that includes "ABCDE98765" has 10 positions (i.e., characters) and is therefore segmented into 5-gram chunks. These 5-gram chunks may include segmented chunks of "ABCDE," "BCDE9," "CDE98," "DE987," "E9876," and "98765." Expanding to 5-gram chunks for longer inputs may improve the contextual coverage of the data input, particularly for longer position (or character) data inputs. 5-gram chunks may give a more complete coverage of the data input, as 5 positions of the data input are together in each chunk. 4-gram chunks may have 4 positions of data input that are included in each chunk. For smaller data inputs, though, the contextual coverage of the data input may be minimally improved, or not at all improved, by breaking the input down into 5-gram chunks (as opposed to 4-gram). Therefore, resources (e.g., bandwidth, etc.) may be saved by breaking down smaller inputs (e.g., 9 positions or less) into 4-gram chunks.

Figure 4:
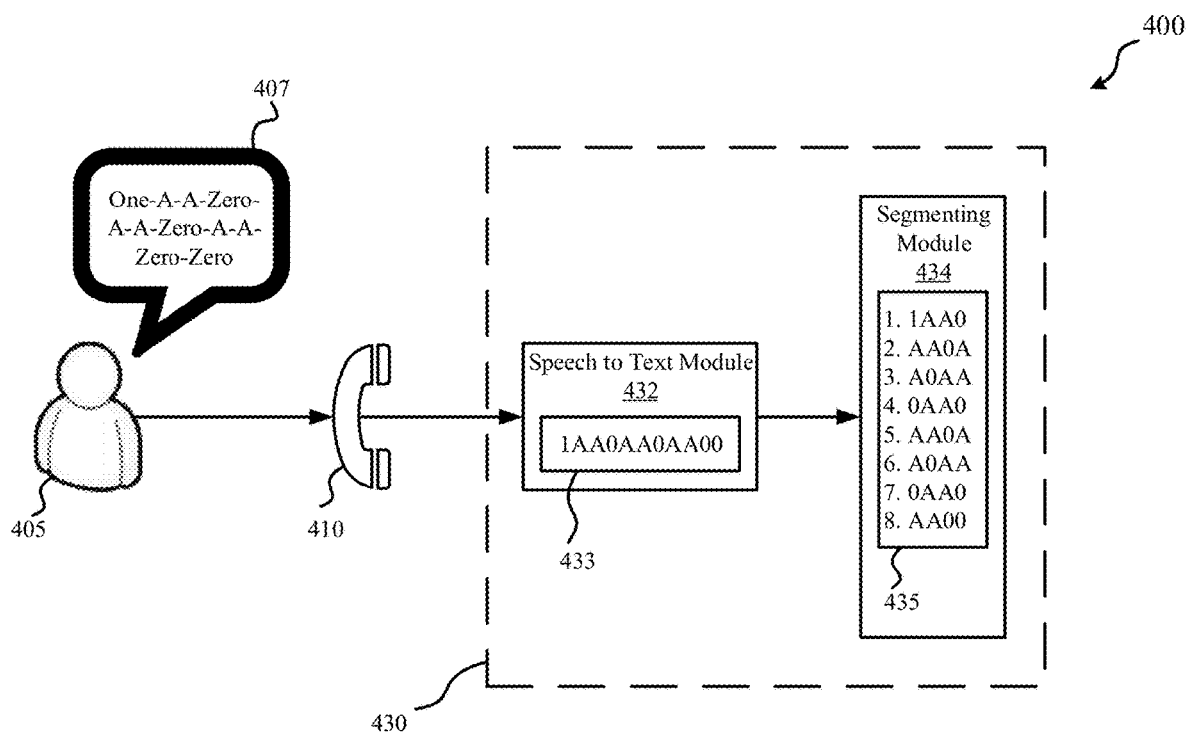
FIG. 4 depicts a schematic diagram of an example speech to text environment utilizing 4-gram chunks, according to some embodiments.
Figure 5:
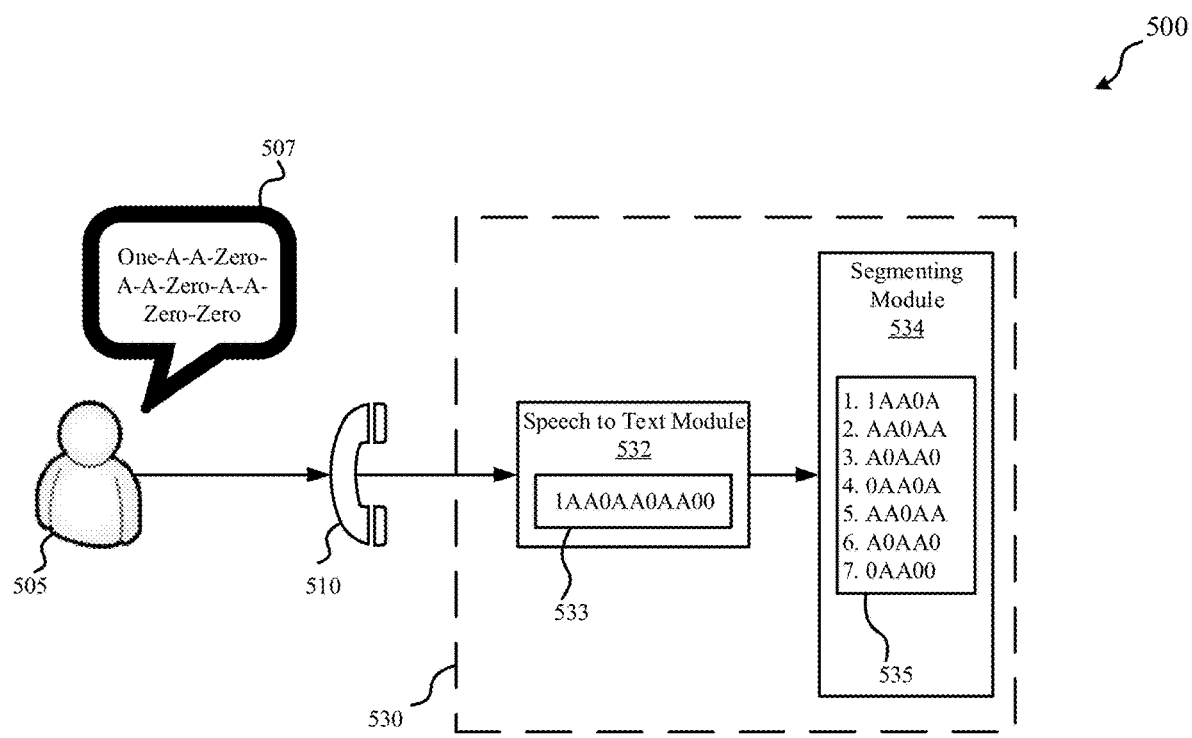
FIG. 5 depicts a schematic diagram of an example speech to text environment utilizing 5-gram chunks, according to some embodiments.

An example data input segmented into 4-gram chunks is discussed further herein and is depicted in FIG. 4. The same example data input segmented into 5-gram chunks is discussed further herein and is depicted in FIG. 5.

Method 100 includes operation 120 to receive metadata regarding characteristics of the data input. In some embodiments, metadata regarding characteristics of the data input may include specific requirements of the data input. For example, if the data input is a social security number, the specific requirements may be that the data input has 9 positions (e.g., 9 characters) and that each position is a number. In another example, if the data input is a birthday, the specific requirements may be that the data input includes a month, a day, and a year.

In another example, the data input may be a Medicare Beneficiary Input (MBI). The MBI may have a specific ruleset, or specific characteristics, of the MBI number. These specific characteristics may be the metadata regarding characteristics of the data input. In the example of the MBI, there may be a specific requirement that the data input includes 11 positions or 11 characters. These 11 characters may have to be in the specific format of C/A/AN/N/A/AN/N/A/A/N/N. There may be specific requirements that the character in any C position must be a numeric from 1-9. Another specific requirement may be that the character in any N position must be a numeric from 0-9. Another specific requirement may be that the character in an A position must be an alphabetic character from A-Z, but that excludes S, L, O, I, B, and Z. Lastly, there may be another requirement that any character in the AN position must be either an A or an N. All these example specific requirements of the MBI may be metadata regarding the characteristics of the data input that is received by the system.

In some embodiments, the metadata regarding the characteristics of the data input is determined by a client. A client (for example, an insurance company, a healthcare company, or any other company utilizing speech recognition technology) may have specific rules for their data inputs (such as healthcare IDs, insurance IDs, etc.) and may transmit these rules, or characteristics, to the system performing method 100. In some embodiments, the system performing method 100 is also the client, so the characteristics may be predetermined and inputted into the system.

Method 100 includes operation 125 to generate a language model based on the metadata. The language model may be a model for translating speech input into text, in some embodiments. As discussed herein, the received data input (in operation 110) may have been translated into text using conventional methods, however these conventional methods may not be very accurate in their translations, particularly for alphanumeric data inputs. Therefore, a language model may be generated (and, as discussed in operation 145, trained) in order to more accurately translate speech into text. This language model, particularly once it has been trained, may be used in future speech recognition situations to translate the speech into text. Additionally, the language model may be used to correct the translation of the data input that was received in operation 110.

In some embodiments, the language model is a machine learning model. In some instances, the language model may be a regular expression (regex) algorithm. A regex algorithm may match each character in an expression with a meaning. For example, using the above example of the MBI, a regex algorithm may match each character with its corresponding characteristic(s) (for instance, relating to its position of C, A, N, or AN). In some instances, the language model may be a rules match algorithm. A rules match algorithm may efficiently apply, or match, many rules or patterns to many characters. For example, again using the MBI example above, the rules match algorithm may match a rule that the character must be a number to positions C and N. The rules algorithm may also match a rule that the character must be a letter to positions A and AN. The rules match algorithm may continue matching rules to positions until all the rules have been matched, in some instances. In some embodiments, the language model is a speech to text grammar model.

In some embodiments, generating the language model includes creating a language model that shows the relationship between the metadata (regarding the characteristics of the data input) and the data input. For example, if the data input is a 4-digit PIN number, the characteristics of the data input may include that each character (or position) of the PIN number is a number/digit. The language model may show the relationship between the PIN number and the metadata (that the character is a number/digit). In another example, if the data input is the MBI, the language model may show the relationship between the first character and the metadata that indicates that the first character must be a number between 1 and 9. The language model may also show the relationship between the second character and the metadata that indicates that the second character has to be a letter between A and Z (and so on for each other character in the MBI). In some embodiments, the language model may show the relationship between the metadata and the segmented n-grams of the data input. Generating the language model may include mapping the relationship between each component of the data input and the metadata.

Method 100 includes operation 130 to generate a first set of language model variations of the data input. The first set of language model variations may be the possible variations of characters and/or positions that may meet the standards of the metadata regarding the characteristics. For instance, the first set of language model variations may be the possible variation of characters/positions that still follow the language model. For example, if the data input is a PIN number (e.g., a 4-digit numerical code) "1123," each position of the PIN number may be a number between 0 and 9. Because there are 10 possible numbers (0-9) for each of the four digits, there may be ten thousand ($10^4$) variations in the first set of language model variations. The set of ten thousand variations may include "1111," "1112," "1113," "1234," "2211," etc., until all possible variations of a 4-digit numerical code are listed in the set. In some embodiments, generating the first set of model variations is based on at least the metadata and the predetermined rule.

Figure 2:
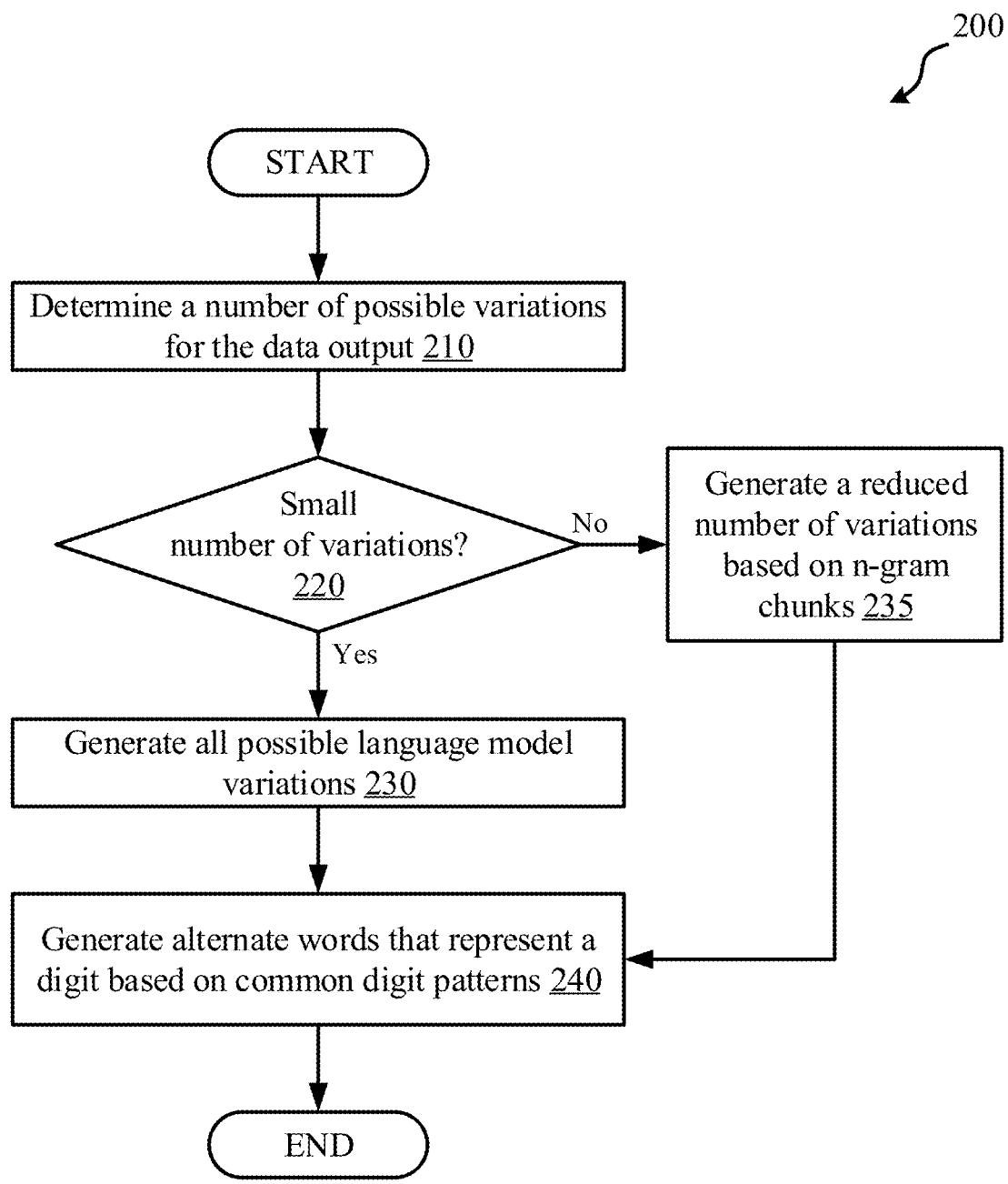
FIG. 2 depicts a flowchart of a set of operations for generating a set of language model variations, according to some embodiments.

Generating the first set of language model variations of the data input is further discussed herein and is depicted in FIG. 2.

In some embodiments, method 100 further includes operation 135 to generate a second set of language model variations. In some instances, generating the second set of language model variations uses common user metadata. Common user metadata may be common speech patterns, phrases, words, terms, etc. The second set of language model variations may include the possible variations of the data input based on common speech patterns. Continuing the previous example, the data input may be a 4-digit PIN number "1123." The first set of language model variations may include a set of ten thousand variations, discussed above. To determine the second set of language model variations, common speech patterns may be used. Common speech patterns, specific to 1123, may include stating "11" as "eleven;" stating "11" as "one, one;" stating "23" as "twenty-three;" stating "23" as "two, three;" stating "12" as "twelve," etc. Therefore, in this example, the second set of language model variations includes at least "one, one, two, three;" "eleven, two, three;" "eleven, twenty three;" "one, one, twenty three;" "one, twelve, three;" etc. In some embodiments, common user metadata may be gathered and learned using machine learning.

In some embodiments, method 100 further includes operation 140 to create prepended text and appended text for a subset of the first and second sets of language model variations. Prepended text may be text inputted before the data input. For example, using the above PIN number example, a user may state (via speech) "my PIN number is 1123." The text "my PIN number is" may be prepended text. Appended text may be text inputted after the data input. For example, with the same PIN number example, a user may state "1123 is my PIN number." The text "is my PIN number" may be appended text. The prepended and appended text may be created using historical text data inputs (for example, that were obtained using conventional methods). In some instances, the prepended and appended text are created using speech data about common speech patterns.

Creating prepended and appended text may include creating sample prepended and appended text that may be used in the data input, based on a subset of the first set of language model variations and the second set of language model variations. For example, if the data input is a 4-digit PIN number, the first set of language model variations may include ten thousand possible variations of the PIN number. Sample prepended text (such as "my PIN number is . . . ") and sample appended text (such as " . . . is my PIN number") may not need to be generated for each of the ten thousand variations in the first set of language model variations. The prepended text and appended text may become very repetitive if generated for each of the ten thousand variations. Therefore, prepended and appended text may be generated, for example, for a subset of one thousand randomly selected variations (from the ten thousand variations). One variation may have prepended text such as "this is my PIN number . . . ," another variation may have prepended text of "ready? Ok, it is . . . ," another variation may have prepended text of simply "it is." Only a subset of the language model variations may be used in order to increase the efficiency of the creating the prepended and appended text (as fewer variations may need to be reviewed).

In some embodiments, creating the prepended text and the appended text includes analyzing the common user metadata. As discussed herein, common user metadata may be common speech patterns, phrases, words, terms, etc. that are used by users. Analyzing the common user metadata may indicate which phrases (for instance that prepend and/or append the numeric, or alphanumeric, data input) may be used along with the data input.

In some embodiments, creating the prepended text and appended text includes determining, based on the analysis, common prepended phrases and appended phrases used when speech is inputted. In some embodiments, the system has access to historical input data. Historical input data may include past data about the inputs submitted by users (e.g., via speech). Historical input data may be used, along with the common user metadata, to determine common phrases that prepend and/or append the data input.

In some embodiments, creating the prepended text and the appended text includes generating a plurality of template sentences for the subset of the first set and the second set of language model variations. In some embodiments, a random subset of the first set of language model variations and a random subset of the second set of language model variations may be selected. For each language model variation (from the subset), a template sentence (with prepended text and/or appended text) may be generated. For example, for a language model variation that is a subset of the first set of language model variations (e.g., PIN number 1111), the template sentence may be "eleven-eleven is my PIN."

Method 100 includes operation 145 to train the language model based on at least the first set of language model variations. The originally generated language model (generated in operation 125) may be generated based on the data input itself, along with the general rules, requirements, characteristics, etc. for the data input (as indicated by the metadata received in operation 120). The originally generated language model may not consider all the specific variations that are possible for the data input. For example, a data input (when spoken) may be "one hundred seventy five" and the characteristics for the data input may include that the data input is a 5-digit PIN number. The initial speech to text translation (for example, done using conventional methods) may translate the speech to "175." The originally generated language model may correct the data input to "00175," as five digits are required (based on the metadata). However, in this example, the user may have meant to relay that the data input is "10075." All possible variations for a 5-digit PIN number may be the first set of language model variations, in this example. Training the language model based on these variations, may include having the model learn each possible variation of the 5-digit pin. This way, the trained language model may identify that a possible alternate translation to the speech input is "10075" (identified in operation 150, using the model trained in operation 145). This alternate may not have been identified using the original learning model, therefore the trained model may be more accurate, in this example. The first set of language variations, including possible variations for the data input, may help train the model to accurately identify and translate the speech data input, as the language model may learn all possible variations, or at least a large amount of possible variations, for the data input.

In some embodiments, when method 100 includes operations 135 and 140, training the language model may further be based on the second set of language model variations and the prepended text and appended text. The second set of language variations may include variations of the data input based on common speech patterns and the prepended/appended text may include possible text/speech in addition to the requisite data input. Training the language model using the first set of language model variations, the second set of language model variations, and the prepended/appended text may allow the language model to learn the possible variants and speech habits that may occur when data is being inputted, and thus may more accurately translate the speech input into text.

In some embodiments, an acoustic model may also be generated and trained using the first set of language variations, the second set of language variations, the prepended and appended text, and the data input. An acoustic model may show the relationship between linguistic units (such as phonemes) and an audio input. In some embodiments, the acoustic model may be generated based on the vocal recording and text transcript of the data input. Then, the model may be trained using the first set of language variations, the second set of language variations, the prepended and appended text, and the data input. In some instances, the acoustic model is also trained using the language model (generated in operation 125).

Method 100 includes operation 150 to generate one or more alternatives for the data input using the trained language model. In some embodiments, operation 150 also uses the trained acoustic model. In some embodiments, one or more alternatives for the data input include one or more possible (other) translations of the specific speech input. For example, a user may say "my date of birth is Jan. 8, 1974" (for example, into a telephone). The initial data input may have translated the speech into the text "my date of birth is January H 1970 for." The initial data input may have mistaken the "8" for an "h" and the "4" for the word "for." Using the trained learning model, alternatives such as "January A, 1974;" "Jan. 8, 1970, for;" and "Jan. 8, 1974" may be generated. In some instances, as the language model is continually learned and trained, the model may become increasingly accurate in identifying/translating the data input properly. In some instances, only the alternative "Jan. 8, 1974" may be generated (for instance, when the model is well trained).

Figure 3:
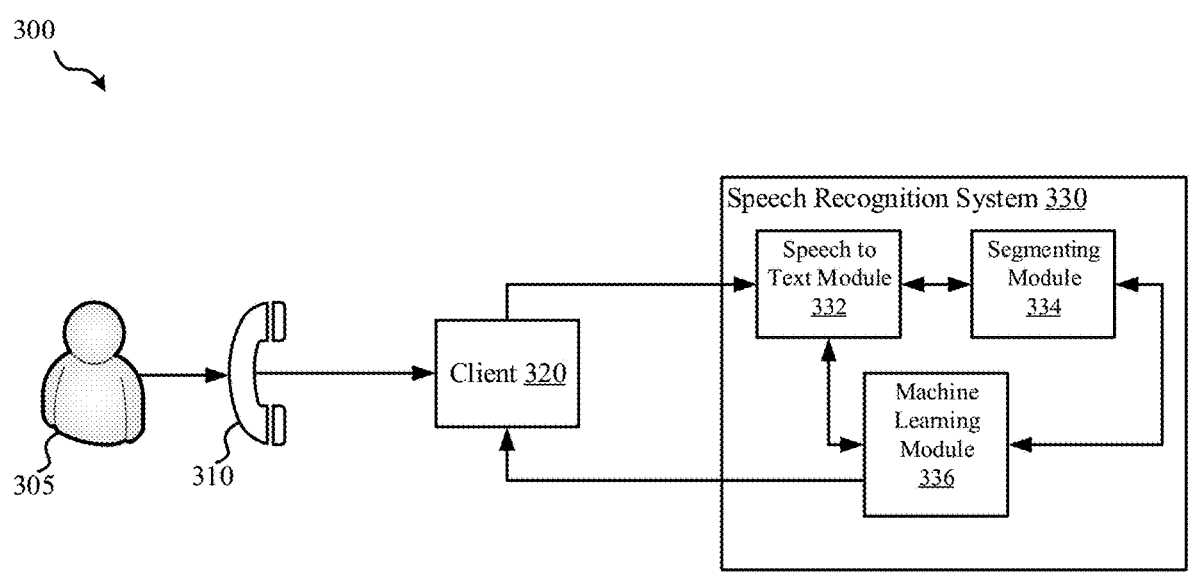
FIG. 3 depicts a schematic diagram of an example speech recognition environment, according to some embodiments.

Method 100 includes operation 155 to transmit an output including the one or more alternatives for the data input. In some embodiments, the output may be transmitted to a client. The client may be an intermediate between the user and the speech recognition system (for example, as depicted in FIG. 3). In some embodiments, the client is part of the system performing method 100, so the output may be transmitted to a different component of the system, for example, that may directly receive speech inputs from various users.

Referring to FIG. 2 a flowchart illustrating a method 200 for generating a set of language model variations is depicted, according to some embodiments. In some embodiments, method 200 may correspond to operation 130 (FIG. 1).

Method 200 includes operation 210 to determine a number of possible variations for the data input. In some embodiments, determining the number of possible variations is based on the total number of positions, or characters, necessary for the data input (for instance, as indicated by the metadata regarding characteristics of the data input). For example, a data input that indicates a PIN number may have a required four positions (as the PIN may be a 4-digit PIN number). The PIN number may consist of only numbers, so each position may have a possibility of a digit between 0-9 (i.e., ten possible numbers). Therefore, in this example, the total number of possible variations may be $10^4$, or ten thousand variations.

Using the 11 position MBI example from above, each MBI position may have different rules. For instance, the first position (numbers 1-9) may have nine possible numbers, the second position may have twenty possible letters, the third position may have two possible letters, the fourth position may have ten possible numbers, the fifth position may have twenty possible letters, the sixth position may have two possible letters, the seventh position may have ten possible numbers, the eighth position may have twenty possible letters, the ninth position may have twenty possible letters, the tenth position may have ten possible numbers, and the eleventh position may have ten possible numbers (based on the specific MBI rules, discussed above). This may result in a total of approximately 80 trillion possible variations.

Method 200 includes operation 220 to determine whether the amount of variations is a small number of variations. In some embodiments, a small number of variations is based on a threshold value predetermined by the client. What is considered a "small" number of variations may depend on the use case. For example, in some use cases, a small number of variations may be a number of variations less than one million variations. In other use cases, a small number of variations may be a number of variations less than 5 million variations.

In some embodiments, determining whether the number of possible variations is a small number of variations includes comparing the number of possible variations to the threshold number of variations. If the number of possible variations is larger than the threshold number of variations, the number of variations may be a large (i.e., not small) number of variations.

If it is determined that the number of possible variations is a small number of variations, method 200 may proceed to operation 230 to generate all possible language model variations. For example, continuing the previous PIN number example, because the ten thousand possible PIN number variations is less than one million variations, the ten thousand possible PIN number variations may be a small number of variations. Therefore, all ten thousand possible PIN number variations may be generated. These may include variations such as "1111;" "1122;" "2222;" "2233;" "3333;" "3344;" "4444;" "4455;" "5555;" "5566;" "6666;" "7777;" "8888;" "9999;" etc.

If it is determined that the number of possible variations is a large, or is not a small, number of variations, method 200 may proceed to operation 235 to generate a reduced number of variations for the data input based on the n-gram chunks.

For example, as discussed herein, a data input of an MBI may have 80 trillion possible variations, which may be determined to be a large (i.e., not small) number of variations. Therefore, not every possible variation of the 80 trillion variations may be generated. Instead, the variations may be generated based on the n-gram chunks. For instance, the data input may have been segmented into 4-gram chunks. An MBI data input may be alphanumeric (i.e., it can include both letters and numbers), so there may be 36 possible characters (26 letters (A-Z) and 10 numbers (0-9)). The reduced number of variations for an alphanumeric data input segmented into 4-gram chunks may be $36^4$, or approximately 1.7 million variations. For a data input that was segmented into 5-gram chunks, the reduced number of variations for an alphanumeric data input may be $36^5$, or approximately 60 million variations.

In some embodiments, when all possible language model variations are generated (for instance, in operation 230), it is determined (after the alternate words are generated in operation 240), which language model variations include the number(s) that have alternate words. For each language model variation that includes the number(s), an additional variation may be generated with the alternate word replacing the number. For example, for each variation that includes a 0, an additional variation may be generated replacing the "0" with an "oh," or the letter "O."

In some embodiments, when the reduced number of variations are generated (for instance, in operation 235), it is determined (after the alternate words are generated in operation 240), which language model variations (from the reduced number of variations) include the number(s) that have alternate words. For each language model variation that includes the number(s), an additional variation may be generated with the alternate word replacing the number.

Method 200 includes operation 240 to generate alternate words or text that may represent a number (based on common digit patterns). For example, the word "oh" may be used to represent the number 0. Common digit patterns may be determined based on historical data. Common digit patterns may be common alternate pronunciations for numbers and/or digits. For example, a digit 0 may be pronounced as "oh" or "zero." The number 100 may be pronounced as "a hundred," "one hundred," etc. Generating alternate words may include generating additional language model variations with the common alternate pronunciations.

Referring to FIG. 3 a schematic diagram of an example speech recognition environment 300 is depicted, according to some embodiments. Speech recognition environment may include a user 305, a telephone 310, a client 320, and a speech recognition system 330. In some embodiments, speech recognition system 330 includes a computer system 500 (FIG. 5). Speech recognition system 330 may perform method 100 from FIG. 1 (and method 200 from FIG. 2), in some embodiments. Speech recognition system 330 includes speech to text module 332, segmenting module 334, and machine learning module 336.

In some embodiments, the user 305 is speaking into the telephone 310. The speech may be transferred from the telephone 310 to the client 320. The client 320 may transfer the speech input to the speech to text module 332. In some embodiments, the speech to text module 332 may receive the speech input (for example, operation 110 of FIG. 1) and may translate the speech input into text. The text input may then be transferred to segmenting module 334 and segmenting module may perform, for example, operations 115 and 120 of FIG. 1. The segmented data input (from operation 115 (FIG. 1)) may be transferred to the machine learning module 336 and machine learning module 336 may perform, for example, operations 125-155 of method 100 (FIG. 1). The machine learning module 336 may transmit the output back to client 320, in some embodiments. In some instances, machine learning module also transmits the updated (for example, trained) learning model to speech to text module 332.

In some embodiments, the client may be the owner of the speech recognition system 330. Therefore, the client 320 may not be included in speech recognition environment 300, in some embodiments. In these instances, the speech input (from telephone 310) may go directly to speech to text module 332.

Referring to FIG. 4 a schematic diagram of an example speech to text environment 400 utilizing 4-gram chunks is depicted, according to some embodiments. Speech to text environment 400 may include a user 405 who states speech input 407 (which, in this instance, is an MBI) into a telephone 410. In some embodiments, user 405 and telephone 410 may correspond to user 305 and telephone 310 from FIG. 3. The speech input 407 may be transmitted to speech to text module 432 and speech to text module 432 may translate the speech input 407 into data input (i.e., text input) 433. The data input 433 is transferred to segmenting module 434, and segmenting module may segment the data input 433 into 4-gram chunks. The 4-gram chunks of data input 433 include 1AA0; AA0A; A0AA; 0AA0; AA0A; A0AA; 0AA0; and AA00. Segmenting the data input 433 into 4-gram chunks may include starting with the first position of the data input 433 and selecting the next three (not including the first position) positions. This may be the first 4-gram chunk. Segmenting the data input 433 may further include starting with the second position of the data input 433 and selecting the next three positions (not including the second position). This may repeat until all positions of the data input 433 have been segmented.

Speech to text module 432 and segmenting module 434 may be a part of speech recognition system 430. In some embodiments, speech to text module 432, segmenting module 434, and speech recognition system 430 correspond to speech to text module 332, segmenting module 334, and speech recognition system 330 (FIG. 3) respectively.

Referring to FIG. 5 a schematic diagram of an example speech to text environment 500 utilizing 5-gram chunks is depicted, according to some embodiments. Speech to text environment 500 may include a user 505 who states speech input 507 (which, in this instance, is an MBI) into a telephone 510. In some embodiments, user 505 and telephone 510 may correspond to user 305 and telephone 310 from FIG. 3. The speech input 507 may be transmitted to speech to text module 532 and speech to text module 532 may translate the speech input 507 into data input (i.e., text input) 533. The data input 533 is transferred to segmenting module 534, and segmenting module may segment the data input 533 into 5-gram chunks. The 5-gram chunks of data input 533 include 1AA0A; AA0AA; A0AA0; 0AA0A; AA0AA; A0AA0; and 0AA00. Segmenting the data input 533 into 5-gram chunks may include starting with the first position of the data input 533 and selecting the next four (not including the first position) positions. This may be the first 5-gram chunk. Segmenting the data input 533 may further include starting with the second position of the data input 533 and selecting the next four positions (not including the second position). This may repeat until all positions of the data input 533 have been segmented.

Speech to text module 532 and segmenting module 534 may be a part of speech recognition system 530. In some embodiments, speech to text module 532, segmenting module 534, and speech recognition system 530 correspond to speech to text module 332, segmenting module 334, and speech recognition system 330 (FIG. 3) respectively.

Figure 6:
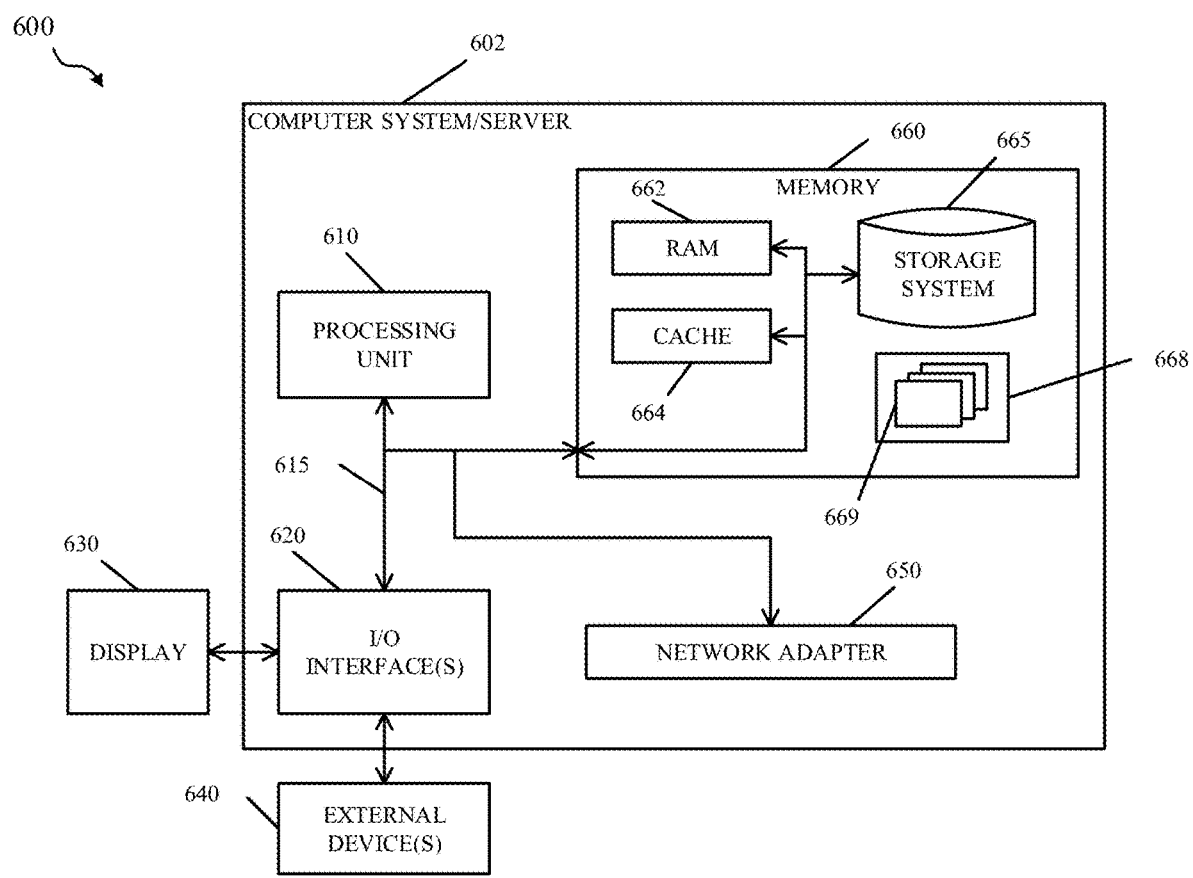
FIG. 6 depicts a block diagram of a sample computer system, according to some embodiments.

Referring to FIG. 6, computer system 600 is a computer system/server 602 is shown in the form of a general-purpose computing device, according to some embodiments. In some embodiments, computer system/server 602 is located on the linking device. In some embodiments, computer system 602 is connected to the linking device. The components of computer system/server 602 may include, but are not limited to, one or more processors or processing units 610, a system memory 660, and a bus 615 that couples various system components including system memory 660 to processor 610.

Bus 615 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 660 can include computer system readable media in the form of volatile memory, such as random-access memory (RAM) 662 and/or cache memory 664. Computer system/server 602 may further include other removable/non-removable, volatile/non-volatile computer system storage media. By way of example only, storage system 665 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 615 by one or more data media interfaces. As will be further depicted and described below, memory 660 may include at least one program product having a set (e.g., at least one) of program modules that are configured to carry out the functions of embodiments of the disclosure.

Program/utility 668, having a set (at least one) of program modules 669, may be stored in memory 660 by way of example, and not limitation, as well as an operating system, one or more application programs, other program modules, and program data. Each of the operating system, one or more application programs, other program modules, and program data or some combination thereof, may include an implementation of a networking environment. Program modules 669 generally carry out the functions and/or methodologies of embodiments of the invention as described herein.

Computer system/server 602 may also communicate with one or more external devices 640 such as a keyboard, a pointing device, a display 630, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 620. Still yet, computer system/server 602 can communicate with one or more networks such as a local area network (LAN), a general wide area network (WAN), and/or a public network (e.g., the Internet) via network adapter 650. As depicted, network adapter 650 communicates with the other components of computer system/server 602 via bus 615. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   segmenting a data input into sequential n-gram chunks based on a predetermined rule, wherein the data input is received through speech recognition;
   receiving metadata regarding characteristics of the data input;
   generating a language model based on the metadata;
   generating a first set of language model variations of the data input;
   generating, in response to generating the first set of language model variations, a second set of language model variations;
   generating a plurality of template sentences for the subset of the first set and the second set of language model variations;
   training the language model based on at least the first set of language model variations;
   generating one or more alternatives for the data input using the trained language model; and
   transmitting an output comprising the one or more alternatives for the data input.

2. The method of claim 1, wherein the generating the first set of language model variations is based on at least the metadata and the predetermined rule.

3. The method of claim 2, wherein the generating the plurality of template sentences is included in a process of creating prepended text and appended text for a subset of the first set and the second set of language model variations.

4. The method of claim 3, wherein the training the language model is further based on the second set of language model variations, the prepended text, and the appended text.

5. The method of claim 3, wherein creating the prepended text and appended text further comprises:
   analyzing the common user metadata; and
   determining, based on the analysis, common prepended phrases and appended phrases used when speech is inputted.

6. The method of claim 1, wherein generating the first set of language model variations comprises:
   determining a number of possible variations for the data input.

7. The method of claim 6, further comprising:
   determining that the number of possible variations for the data input is below a threshold number of variations; and
   generating, in response to the determining, all possible language model variations of the data input.

8. The method of claim 6, further comprising:
   determining that the number of possible variations for the data input is above a threshold number of variations; and
   generating, in response to the determining, a reduced number of variations for the data input based on the n-gram chunks.

9. The method of claim 6, wherein generating the first set of language model variations of the data input comprises:
   generating alternate words that may represent a number based on common digit patterns.

10. The method of claim 1, wherein the n-gram chunks are one of 4-gram chunks and 5-gram chunks.

11. A system having one or more computer processors, the system configured to:
    segment a data input into a sequential n-gram chunks based on a predetermined rule, wherein the data input is received through speech recognition;
    receive metadata regarding characteristics of the data input;
    generate a language model based on the metadata;
    generate a first set of language model variations of the data input;
    generate, in response to generating the first set of language model variations, a second set of language model variations;
    generate a plurality of template sentences for the subset of the first set and the second set of language model variations;
    train the language model based on at least the first set of language model variations;
    generate one or more alternatives for the data input using the trained language model; and
    transmit an output comprising the one or more alternatives for the data input.

12. The system of claim 11, wherein the generating the first set of language model variations is based on at least the metadata and the predetermined rule.

13. The system of claim 12, wherein the generating the plurality of template sentences is included in a process of creating prepended text and appended text for a subset of the first set and the second set of language model variations.

14. The system of claim 13, wherein the training the language model is further based on the second set of language model variations, the prepended text, and the appended text.

15. The system of claim 13, wherein creating the prepended text and appended text further comprises:
    analyzing the common user metadata; and
    determining, based on the analysis, common prepended phrases and appended phrases used when speech is inputted.

16. A computer program product comprising a computer readable storage medium having program instructions embodied therewith, the program instructions executable by a server to cause the server to perform a method, the method comprising:
    segmenting a data input into a sequential n-gram chunks based on a predetermined rule, wherein the data input is received through speech recognition;
    receiving metadata regarding characteristics of the data input;
    generating a language model based on the metadata;
    generating a first set of language model variations of the data input;
    generating, in response to generating the first set of language model variations, a second set of language model variations;

generating a plurality of template sentences for the subset of the first set and the second set of language model variations;

training the language model based on at least the first set of language model variations;

generating one or more alternatives for the data input using the trained language model; and transmitting an output comprising the one or more alternatives for the data input.

17. The computer program product of claim 16, wherein the generating the first set of language model variations is based on at least the metadata and the predetermined rule.

18. The computer program product of claim 17, wherein the generating the plurality of template sentences is included in a process of creating prepended text and appended text for a subset of the first set and the second set of language model variations.

19. The computer program product of claim 18, wherein creating the prepended text and appended text further comprises:

analyzing the common user metadata; and determining, based on the analysis, common prepended phrases and appended phrases used when speech is inputted.

20. The method of claim 1, wherein the data input is alphanumeric.

* * * * *